(12) United States Patent
Gerard

(10) Patent No.: US 8,647,739 B2
(45) Date of Patent: Feb. 11, 2014

(54) TRANSPARENT FLAT ARTICLE MADE OF NANOSTRUCTURED ACRYLIC MATERIALS

(75) Inventor: Pierre Gerard, Denguin (FR)

(73) Assignee: Arkema France, Colombes (FR)

( * ) Notice: Subject to any disclaimer, the term of this patent is extended or adjusted under 35 U.S.C. 154(b) by 483 days.

(21) Appl. No.: 13/120,767

(22) PCT Filed: Sep. 25, 2009

(86) PCT No.: PCT/FR2009/051825
§ 371 (c)(1),
(2), (4) Date: Apr. 12, 2011

(87) PCT Pub. No.: WO2010/034952
PCT Pub. Date: Apr. 1, 2010

(65) Prior Publication Data
US 2011/0183135 A1    Jul. 28, 2011

(30) Foreign Application Priority Data

Sep. 26, 2008 (FR) ...................... 08 56485

(51) Int. Cl.
*B32B 27/30* (2006.01)
*C08L 53/00* (2006.01)
*C08L 33/12* (2006.01)
*C08L 33/08* (2006.01)

(52) U.S. Cl.
USPC .............. 428/220; 428/500; 428/522; 525/94

(58) Field of Classification Search
USPC .............. 428/212–220, 500–533; 525/70–99, 525/153
See application file for complete search history.

(56) References Cited

U.S. PATENT DOCUMENTS

| 5,213,852 | A | 5/1993 | Arakawa et al. | |
|---|---|---|---|---|
| 2006/0063891 | A1* | 3/2006 | Ruzette et al. | 525/330.3 |
| 2006/0128892 | A1 | 6/2006 | Hidalgo et al. | |
| 2006/0256277 | A1 | 11/2006 | Rudin | |
| 2007/0178325 | A1* | 8/2007 | Edgecombe et al. | 428/500 |
| 2008/0050572 | A1* | 2/2008 | Guerret et al. | 428/220 |

FOREIGN PATENT DOCUMENTS

| JP | 2002194167 A | * 7/2002 | C08L 33/06 |
|---|---|---|---|
| JP | 2003015536 | 1/2003 | |
| KR | 20030056686 | 7/2003 | |

OTHER PUBLICATIONS

Machine translation of JP2002-194167. Retrieved Sep. 30, 2013.*

* cited by examiner

*Primary Examiner* — Prashant J Khatri
(74) *Attorney, Agent, or Firm* — RatnerPrestia

(57) ABSTRACT

The present invention relates to the field of nanostructured acrylic polymer materials having both very good optical properties and good mechanical and surface properties. The invention relates to an acrylic resin composition containing a PMMA matrix (component 1) having a glass transition temperature of greater than 0° C., dispersed in which is an acrylic block copolymer (component 2). Characteristically, the composition of the invention contains from 60 to 80% by weight of said PMMA matrix, and from 20 to 40% by weight of said block copolymer. According to another aspect, the invention relates to a transparent flat article containing the aforementioned acrylic resin composition, having the following features: a thickness ranging from 300 to 900 microns, preferably from 400 to 700 micrometers; a light transmission at least equal to 91%; a haze of less than or equal to 2%; and no appearance of haze when the temperature rises to 80° C.

15 Claims, No Drawings

TRANSPARENT FLAT ARTICLE MADE OF NANOSTRUCTURED ACRYLIC MATERIALS

The present invention relates to the field of nanostructured acrylic polymer materials having both very good optical properties and good mechanical and surface properties. These materials are intended in particular for the manufacture of light guide flat panels or LGPs for "Light Guide Panels" or edge-lit extra-flat panels, which are essential components of flat-panel displays for computers and televisions and provide the function of a light diffuser for a large number of portable devices, such as laptop computers, telephones, games consoles, etc.

Flat-panel displays are becoming increasingly widespread insofar as their space factor and their weight are much lower than those of conventional cathode-ray tube displays. Furthermore, the technologies used in flat displays consume less energy (consumption of less than 10 W versus 100 W for cathode-ray tube displays) and do not emit electromagnetic radiation. The esthetic factor also plays an important role in the interest that flat panels have generated for several years.

It is known to manufacture panels for flat-panel displays from polymer materials. For this purpose, materials such as acrylic resins, polycarbonates, polyesters (US 2006/256277), styrene/acrylonitrile copolymers (U.S. Pat. No. 5,213,852) etc. have already been used.

Tests carried out by the Applicant have shown that displays manufactured from polymethyl methacrylate (PMMA) have very good transparency properties. However, these displays become too fragile and brittle when their thickness is less than 1 mm.

Furthermore, "high-impact" PMMA containing additives of core/shell type with a core made of elastomer, for example butyl acrylate and a shell made of PMMA, has improved properties in terms of mechanical strength, but is characterized by a loss of light transmission with temperature, which renders its use unfit for the manufacture of flat panels, and in particular extra-flat panels, which heat up during their use (heating due to the use of diodes for lighting the display along the edge). This type of material undergoes a loss of light transmission as a function of the temperature, which is not suitable for this application.

Other displays manufactured from polycarbonate, described in document JP 2003-15536, themselves also exhibit good transparency properties, and very good impact strength. The surface properties of these materials, such as their scratch and abrasion resistance, are not however sufficient to enable their use in the manufacture of flat or extra-flat displays, with which the user maintains a direct contact. Their light transmission properties are weaker than those obtained with a PMMA.

Amorphous transparent sheets of polyethylene terephthalate have also been used as support material in display devices, as indicated for example in document KR 2003/0056686. The use of these sheets is widespread due to their ability to be manufactured in various shapes by molding. This material is not however suitable for use in portable display devices, due to their inadequate flexural strength and scratch resistance. This is due to the fact that their thickness is limited, in practice, to a maximum of 200 microns.

There is therefore an increased need for a polymer material that has both very good optical properties (light transmission, lack of haze), mechanical properties (impact strength) and surface properties (scratch and abrasion resistance) while retaining these properties (especially optical properties) over a wide range of operating temperatures of the flat display, ranging from ambient temperature up to 80° C.

The objective of the present invention is to overcome the aforementioned drawbacks.

The present invention proposes to provide a nanostructured acrylic material having both very good optical properties which remain constant over a wide range of temperatures (ranging from ambient temperature to 80° C.) and which maintains good surface properties (abrasion and scratch resistance) and mechanical properties (impact strength) even when said material has a small thickness, typically of less than 1 mm.

The expression "small thickness" is understood according to the invention to mean a flat-display thickness ranging from 300 to 900 microns, preferably between 400 and 700 micrometers.

According to a first aspect, the invention relates to an acrylic resin composition containing a PMMA matrix (component 1) having a glass transition temperature of greater than 0° C., dispersed in which is an acrylic block copolymer (component 2) corresponding to the formula $(A)_m\text{-}(B)_p\text{-}I$, p being an integer greater than or equal to 2, m being an integer less than or equal to p, B being a polymer block bonded directly to the core I by a covalent bond, obtained by the polymerization of a mixture of monomers ($B_0$) containing at least 60% by weight of acrylic monomers ($b_1$), A being a polymer block, bonded directly to the B block by a covalent bond, obtained by the polymerization of a mixture of monomers ($A_0$) containing at least 60% by weight of methacrylic monomers ($a_1$).

The core (I) is an organic group having n (greater than or equal to 2) carbon atoms to which the B blocks are attached via one of the valencies of these carbon atoms. I corresponds to one of the general formulae Ia, Ib and Ic below:

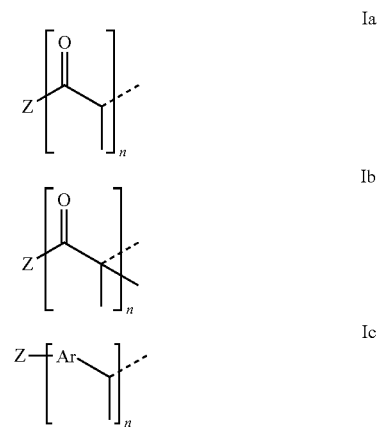

where Ar denotes a substituted aromatic group, Z is a polyfunctional organic or mineral radical having a molecular weight of greater than or equal to 14.

PMMA denotes a homopolymer or copolymer of methyl methacrylate (MMA), comprising by weight at least 50% of MMA. The copolymer is obtained from MMA and from at least one comonomer copolymerizable with the MMA. Preferably, the copolymer comprises, by weight, from 70 to 99.5%, advantageously from 80 to 99.5%, preferably from 80 to 99% of MMA for respectively from 0.5 to 30%, advantageously from 0.5 to 20%, preferably from 1 to 20% of comonomer. Preferably, the comonomer copolymerizable with the MMA is a (meth)acrylic monomer or a vinyl aromatic monomer such as for example styrene, substituted styrenes, alpha-methylstyrene, monochlorostyrene or tert-butylstyrene. Preferably, it is an alkyl (meth)acrylate, in particular methyl, ethyl, propyl or butyl acrylate or butyl methacrylate.

Characteristically, the composition of the invention contains from 60 to 80% by weight of said PMMA matrix, and from 20 to 40% by weight of said block copolymer.

According to a second aspect, the present invention relates to a process for manufacturing a transparent flat article from the aforementioned acrylic resin composition, said process preferably being an extrusion process, in order to obtain a sheet having a thickness between 300 and 900 microns.

According to another aspect, the invention relates to a transparent flat article containing the aforementioned acrylic resin composition, having the following features:
- a thickness ranging from 300 to 900 microns, preferably from 400 to 700 micrometers;
- a light transmission at least equal to 91%;
- a haze of less than or equal to 2%;
- no appearance of haze when the temperature rises to 80° C.

According to yet another aspect, the invention relates to the use of the aforementioned transparent flat article in devices of the LCD flat panel type equipped with light-emitting diodes or LEDs or extra-flat displays with tangential (edge) lighting.

According to another aspect, the invention relates to flat or extra-flat displays comprising at least one transparent flat article according to the invention.

DETAILED DESCRIPTION OF THE INVENTION

The present invention provides a nanostructured acrylic material having both very good optical properties which remain constant over a wide range of temperatures (ranging from ambient temperature up to 80° C.) and which retain good surface properties (abrasion and scratch resistance) and mechanical properties (impact strength) even when said material has a small thickness.

Said material is in the form of an acrylic resin composition containing a PMMA matrix (component 1), having a glass transition temperature of greater than 0° C., dispersed in which is an acrylic block copolymer (component 2) of general formula $(A)_m\text{-}(B)_p\text{-}I$ in which:
- p is an integer greater than or equal to 2,
- m is an integer less than or equal to p,
- B is a polymer block bonded directly to the core I via a covalent bond, obtained by the polymerization of a mixture of monomers ($B_0$) containing at least 60% by weight of acrylic monomers ($b_1$),
- A is a polymer block, bonded directly to the B block via a covalent bond, obtained by the polymerization of a mixture of monomers ($A_0$) containing at least 60% by weight of methacrylic monomers ($a_1$),
- the core (I) is an organic group having n (greater than or equal to 2) carbon atoms to which the B blocks are attached via one of the valencies of these carbon atoms. I corresponds to one of the general formulae Ia, Ib and Ic below:

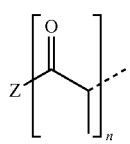

Ia

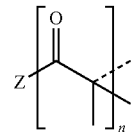

Ib

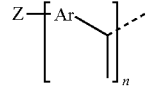

Ic

Ia, Ib and Ic result from the thermal decomposition of the corresponding alkoxyamine as described later on (formulae II), where Ar denotes a substituted aromatic group, Z is a polyfunctional organic or mineral radical having a molecular weight of greater than or equal to 14. Z is associated with n functions of acryl type in formula Ia, with n functions of methacryl type in formula Ib and with n functions of styryl type in Ic.

By way of non-limiting example of the scope of the invention, Z may be a polyalkoxy group, in particular a dialkoxy group, such as the 1,2-ethanedioxy, 1,3-propanedioxy, 1,4-butanedioxy and 1,6-hexanedioxy radicals, 1,3,5-tris(2-ethoxy)cyanuric acid, a polyaminoamine group, such as polyethylene amines, or 1,3,5-tris(2-ethylamino) cyanuric acid, or a polythioxy, phosphonate or polyphosphonate group. Z may also be an inorganic group for example an organometallic complex such as: $M^{n+}O^-_n$, the second valency of the oxygen atoms corresponds to the bond appearing between Z and the acryl, methacryl and styryl groups. M may be an atom of magnesium, calcium, aluminum, titanium, zirconium, chromium, molybdenum, tungsten, manganese, iron, cobalt, nickel, palladium, platinum, copper, silver, gold, zinc or tin.

Ar represents, for example, a benzene or naphthalene ring comprising one or more substituents chosen from $C_1$ to $C_{18}$, typically $C_1$ to $C_8$, alkyl or alkoxy radicals.

B is a polymer block bonded directly to the core I via a covalent bond, obtained by the polymerization of a mixture of monomers ($B_0$) containing at least 60% by weight of acrylic monomers ($b_1$). B has a glass transition temperature (Tg) of less than 0° C., a weight-average molecular weight (Mw) ranging from 40 000 to 200 000 g/mol and a polydispersity index (Ip) ranging from 1.1 to 2.5 and preferably from 1.1 to 2.0.

The mixture of monomers $B_0$ comprises from 60 to 100% by weight of at least one acrylic monomer ($b_1$) chosen from the alkyl acrylates having an alkyl chain that comprises at least two carbon atoms and preferably at least four carbon atoms such as butyl, octyl, nonyl or 2-ethylhexyl acrylates, polyethylene glycol acrylates or acrylonitrile.

The other monomers ($b_2$) incorporated into the composition of the B block are chosen from radical-polymerizable monomers such as ethylenic monomers, vinyl monomers, etc.

The A block has a Tg of greater than 50° C. It is obtained by the polymerization of a mixture of monomers $A_a$ comprising:
- from 60 to 100% by weight, preferably from 75 to 98% by weight, of at least one methacrylic monomer (a1) chosen from alkyl methacrylates such as methyl, butyl, octyl, nonyl or 2-ethylhexyl methacrylates, or else functional methacrylic compounds such as methacrylic acid, glycidyl methacrylate, methacrylonitrile or any methacrylate comprising an alcohol, amide or amine function,
- from 0 to 40% by weight, preferably from 2 to 25% by weight, of at least one monomer ($a_2$) chosen from anhydrides such as maleic anhydride or vinylaromatic monomers such as styrene or derivatives thereof, in particular alpha-methylstyrene and the monomers corresponding to $b_1$.

Tg denotes the glass transition temperature of a polymer measured by DSC (differential scanning calorimetry) according to the ASTM E1356 standard, for example with temperature ramps of 20° C. per minute.

Furthermore, a proportion of the monomers used for the B block will optionally be maintained in the mixture. This proportion is at most equal to 20% of the mixture of the monomers used for the A block.

The weight-average molecular weight ($M_w$) of the block copolymer $(A)_m$-$(B)_p$-I is between 80 000 g/mol to 300 000 g/mol with a polydispersity between 1.5 and 2.5.

Given that monomers resulting from the B block may be incorporated into the composition of the A block, it is advisable, in order to fully describe the copolymer, to specify its overall content of monomers characteristic of the B block and the ratio of B block to A block. These two ratios are not necessarily the same.

The copolymer $(A)_m$-$(B)_p$-I contains between 60% and 10% by weight of monomers of the B block and preferably between 50 and 25%. The proportion of block B in the block copolymer is between 1.0 and 50%, preferably between 20 and 50%.

The process for preparing copolymers $(A)_m$-$(B)_p$-I is described in detail in document WO 2004/087796. In brief, the process for preparing copolymers $(A)_m$-$(B)_p$-I consists in initiating the polymerization of the monomer(s) necessary for the B block with an initiator of alkoxyamine type. The choice of initiators of the invention is essential for the success of the manufacture of the material: this is because these initiators make it possible to control the number of arms of the block copolymer and the satisfactory sequencing thereof. The latter characteristic depends on the choice of nitroxide control agent produced by the decomposition of the initiating alkoxyamines.

The general formulae of the alkoxyamine initiators chosen according to the invention are therefore the following:

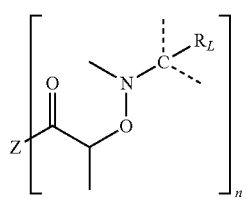
IIa

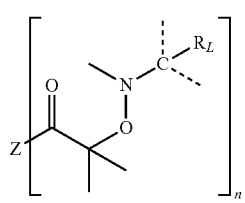
IIb

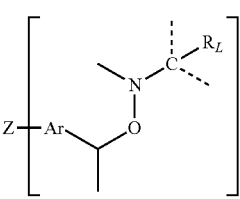
IIc in which:

Z has the same meaning as before, the carbon atom at the alpha position of the NO bond bears at least one organic group RL having a molecular weight greater than or equal to 16 g/mol. The other valencies of the nitrogen or of the carbon at the alpha position bear organic groups such as linear or branched alkyl groups such as tert-butyl or isopropyl groups, which are optionally substituted such as 1,1-dimethyl-2-hydroxyethyl, hydrogen atoms, aromatic rings such as the optionally substituted phenyl group.

The preferred alkoxyamines of the invention are those corresponding to the following formulae:

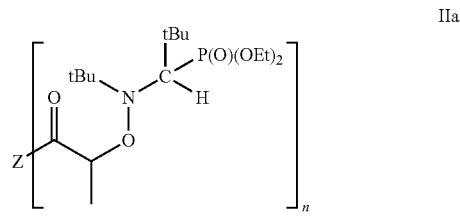
IIa

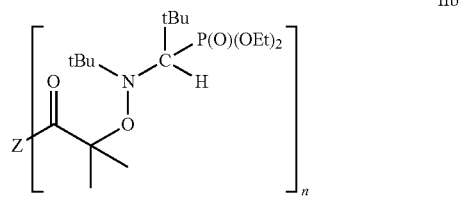
IIb

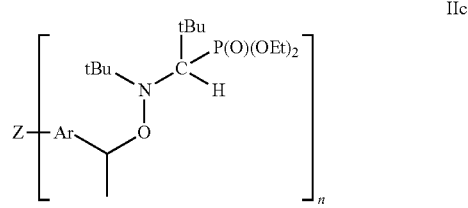
IIc

Combined with the molecules II are nitroxides X corresponding to the general formula:

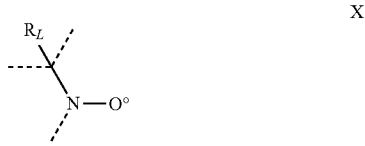
X $R_L$, and also the groups attached to the nitrogen atom and to the carbon atom at the alpha position of the nitrogen have the same meaning as before.

The choice of n as an integer greater than or equal to 2 makes it possible, in particular, to provide a very high level of block copolymers in the final material by limiting the presence of unreacted B block after the formation of A.

The choice of $R_L$ is particularly important so as to ensure, during the formation of B, a good control of the polymerization which makes it possible to maintain a high reactivity of B during the reinitiation of A. Preferably, mention will be made of the following two nitroxides X1 and X2:

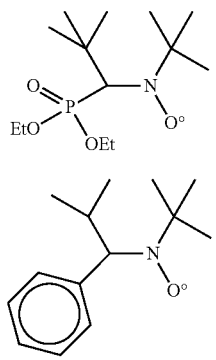

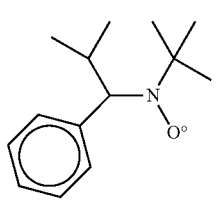

The manufacturing process thus consists in first polymerizing the B block in the presence of an initiator of formula II and optionally an additional amount of compound X at a temperature between 60° C. and 150° C., under a pressure ranging from 1 to 10 bar. The polymerization may be carried out in the presence or absence of a solvent or in a disperse medium. The polymerization is halted before 90% conversion. The choice is made whether or not to evaporate the residual monomer of the B block according to the ease related to the synthesis process. The amount of monomer for the A block is then added. The polymerization of the A block is carried out under conditions similar to those of the B block. The polymerization of the A block is continued to the targeted conversion. The product is recovered simply by drying the polymer according to a means known to a person skilled in the art. During this step, the various additives necessary for the UV and thermal protection required for the acrylic film application are added and a film with the desired thickness is produced by extrusion with a sheet die.

PMMA denotes a homopolymer or copolymer of methyl methacrylate (MMA), comprising by weight at least 50% of MMA. The copolymer is obtained from MMA and from at least one comonomer copolymerizable with the MMA. Preferably, the copolymer comprises, by weight, from 70 to 99.5%, advantageously from 80 to 99.5%, preferably from 80 to 99% of MMA for respectively from 0.5 to 30%, advantageously from 0.5 to 20%, preferably from 1 to 20% of comonomer. Preferably, the comonomer copolymerizable with the MMA is a (meth)acrylic monomer or a vinyl aromatic monomer such as for example styrene, substituted styrenes, alpha-methylstyrene, monochlorostyrene or tert-butylstyrene. Preferably, it is an alkyl (meth)acrylate, in particular methyl, ethyl, propyl or butyl acrylate or butyl methacrylate.

The PMMA could advantageously be a copolymer of MMA and of acrylic acid and/or methacrylic acid. This type of PMMA offers improved thermomechanical strength and also improved scratch resistance compared to a PMMA that does not contain any thereof.

According to a second aspect, the present invention relates to a process for manufacturing a transparent flat article from the aforementioned acrylic resin composition, said process comprising a step of extruding/calendering said composition.

According to another aspect, the invention relates to a transparent flat article containing the aforementioned acrylic resin composition, having the following features:
  a thickness ranging from 300 to 900 microns, preferably from 400 to 700 micrometers;
  a light transmission at least equal to 91%;
  a haze of less than or equal to 2% (percentage of light which is deflected by more than 2.5 degrees relative to the direction of the incident light);
  absence of haze when the temperature rises to 80° C.

It has been observed that the transparent flat article according to the invention has an impact strength of greater than 25 kJ/m$^2$.

According to yet another aspect, the invention relates to the use of the aforementioned transparent flat article in devices of the LCD flat panel type equipped with light-emitting diodes or LEDs or extra-flat displays with tangential (edge) lighting.

The unique properties of this article very particularly recommend it for use in the manufacture of LCD flat displays or extra-flat displays of small thickness, due to its quite remarkable optical properties (light transmission of at least 91%), to the retention of these optical properties regardless of the operating temperature of the flat display, to its good mechanical properties especially impact properties and its good surface properties (abrasion and scratch resistance).

According to another aspect, the invention relates to flat displays or extra-flat displays comprising at least one transparent flat article according to the invention.

The invention will now be illustrated by an exemplary embodiment that does not limit the scope of the invention.

Exemplary Embodiment

An acrylic block copolymer (component 2) was synthesized according to the following process:
Preparation of the B Block
Introduced into a metallic reactor equipped with mechanical stirring and a jacket were 6000 g of n-butyl acrylate, 65 g of 2-methyl-2-[N-tert-butyl-N-(1-diethoxyphosphoryl-2,2-dimethylpropyl)aminoxy]propanoic acid as initiator (resulting, after decomposition, in the formation of an organic group of type Ib), and 3.2 g of N-tert-butyl-N-(1-diethoxyphosphoryl-2,2-dimethylpropyl)aminoxy, used as nitroxide. The initiator/nitroxide molar ratio is 7%.
The temperature of the reaction medium is brought to 115° C. At the end of 225 minutes, the conversion of n-butyl acrylate is 55.3%. Sampling makes it possible to determine, by size exclusion chromatography, the characteristics of the B block thus produced.
Number-average molecular weight Mn: 33 000 Da
Weight-average molecular weight Mw: 44 000 Da
Polydispersity index Ip=Mw/Mn: 1.3
Preparation of the A Block
Next, 2000 g of methyl ethyl ketone, 4000 g of MMA and 444 g of methacrylic acid are poured into the reactor. The polymerization of the A block is carried out at a temperature of 90° C.
Conversion achieved: 51%.
The analysis, by size exclusion chromatography, of the copolymer obtained is the following:
  number-average molecular weight Mn: 77 160 g/mol
  weight-average molecular weight Mw: 134 000 g/mol
  polydispersity index Ip (ratio of $M_w$ to $M_n$): 1.75
  The analysis of the composition by $^1$H NMR indicates:
  n-butyl acrylate content: 42% by weight
  methyl methacrylate content: 53% by weight; and
  methacrylic acid content: 5% by weight.
The block copolymers described above were melt-blended, by extrusion, with a PMMA (component 1) sold by ARKEMA under the reference ALTUGLAS® V021c.
The following samples were used:
  sample 1 (comparative): block copolymer described above (component 2);

sample 2 (comparative): blend of the block copolymer (component 2) with a PMMA matrix (component 1) in the following proportions: 66% component 2 and 34% component 1 (by weight);

sample 3 (according to the invention): blend of the block copolymer (component 2) with a PMMA matrix (component 1) in the following proportions: 34% component 2 and 66% component 1 (by weight);

sample 4 (comparative): polymer of PMMA type reinforced using an impact modifier, sold by ARKEMA under the reference ALTUGLAS® DRT.

These samples were evaluated mechanically and optically according to the respective standards:

Standard ISO 178: determination of the flexural modulus or stiffness, expressed in MPa.

Standard ISO 179-2D: determination of the impact strength on unnotched Charpy test specimens, expressed in $kJ/m^2$.

Standard ASTM D1003: determination of the total light transmission and of the haze, expressed in %.

Standard NFT 51 113: determination of the Ericksen scratch resistance (with a load of 2 N and a rate of 10.5 mm/s), expressed in microns.

The results obtained appear in table 1 below (T being a maximum temperature of 80° C.):

TABLE 1

| | Sample No. | | | |
|---|---|---|---|---|
| | 1 | 2 | 3 | 4 |
| Haze (%) | 5 | 3 | 2 | 2 |
| Light transmission (%) | 91.3 | 91.4 | 91.9 | 91 |
| Flexural modulus (MPa) | 1556 | 2223 | 2840 | 1700 |
| Impact strength (kJ/m²) | 68 | 32 | 26 | 60 |
| Variation of the haze with T | no | no | no | yes |
| Thickness (mm) | 500 | 500 | 500 | 500 |
| Scratch resistance (μm) | — | — | 99 | 124 |

Example 3 of the invention makes it possible to perfectly meet the specifications for an application as a transparent flat display of small thickness (less than 1 mm) that has a high stiffness, an impact value of greater than 25 kJ/m², a light transmission of greater than 90%, a haze value of less than or equal to 2% and above all that does not exhibit a variation of the haze with the temperature.

The invention claimed is:

1. An acrylic resin composition comprising a PMMA matrix having a glass transition temperature of greater than 0° C., having dispersed therein an acrylic block copolymer of general formula $(A)_m$-$(B)_p$-I, p being an integer greater than or equal to 2, m being an integer less than or equal to p, B being a polymer block bonded directly to the core I by a covalent bond, obtained by polymerizing a mixture of monomers ($B_0$) containing at least 60% by weight of acrylic monomers ($b_1$), A being a polymer block, bonded directly to the B block by a covalent bond, obtained by polymerizing a mixture of monomers ($A_0$) containing at least 60% by weight of methacrylic monomers ($a_1$), the core (I) being an organic group corresponding to one of the following formulae:

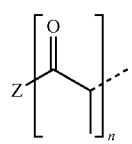

Ia

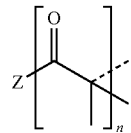

Ib

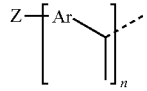

Ic where Ar denotes a substituted aromatic group, Z is a polyfunctional organic or inorganic radical having a molecular weight greater than or equal to 14, n being greater than or equal to 2, wherein said acrylic resin composition comprises from 60 to 80% by weight of said PMMA matrix, and from 20 to 40% by weight of said block copolymer.

2. The composition as claimed in claim 1, in which B has a glass transition temperature (Tg) of less than 0° C., a weight-average molecular weight (Mw) ranging from 40 000 to 200 000 g/mol and a polydispersity index (Ip) ranging from 1.1 to 2.5.

3. The composition as claimed in claim 1, in which the mixture of monomers $B_0$ comprises:
   from 60 to 100% by weight of at least one acrylic monomer ($b_1$) chosen from alkyl acrylates having an alkyl chain that comprises at least two carbon atoms;
   from 0 to 40% by weight of monomers ($b_2$) that are radical-polymerizable monomers.

4. The composition as claimed in claim 1, in which the A block has a Tg temperature of greater than 50° C.

5. The composition as claimed in claim 1, in which the A block is obtained by polymerizing the mixture of monomers $A_0$ which comprises:
   from 60 to 100% by weight of at least one methacrylic monomer ($a_1$) selected from the group consisting of alkyl methacrylates; methyl, butyl, octyl, nonyl or 2-ethylhexyl methacrylates, functional methacrylic compounds, methacrylic acid, glycidyl methacrylate, and methacrylonitrile,
   from 0 to 40% by weight of at least one monomer ($a_2$) selected from the group consisting of anhydrides, as maleic anhydride, vinyl aromatic monomers, styrene, alpha-methylstyrene and the monomers corresponding to $b_1$.

6. The composition as claimed in claim 1, in which the weight-average molecular weight ($M_w$) of the block copolymer $(A)_m$-$(B)_p$-I varies from 80,000 g/mol to 300,000 g/mol, and its polydispersity varies from 1.5 to 2.5.

7. The composition as claimed in claim 1, in which the amount of block copolymer is 34% by weight.

8. The composition as claimed in claim 2, wherein B has a polydispersity index (Ip) ranging from 1.1 to 2.0.

9. The composition as claimed in claim 3, in which the mixture of monomers $B_0$ comprises:
   from 60 to 100% by weight of at least one acrylic monomer ($b_1$) chosen from the alkyl acrylates having an alkyl chain that comprises at least four carbon atoms and selected from the group consisting of butyl, octyl, nonyl or 2-ethylhexyl acrylates, polyethylene glycol acrylates or acrylonitrile;
   from 0 to 40% by weight of monomers ($b_2$) selected from the group consisting of ethylenic monomers, and vinyl monomers.

10. The composition as claimed in claim 5, in which the A block is obtained by polymerizing the mixture of monomers $A_0$ comprising:
   from 75 to 98% by weight of at least one methacrylic monomer ($a_1$)
   from 2 to 25% by weight of at least one monomer ($a_2$).

11. A transparent flat article containing the composition as claimed in claim 1, characterized in that it has the following features:
   a thickness ranging from 300 to 900 microns;
   a light transmission at least equal to 91%;
   a haze of less than or equal to 2%.

12. The transparent flat article as claimed in claim 11, having an impact strength of greater than 25 $kJ/m^2$.

13. An LCD flat panel comprising the transparent flat article as claimed in claim 11.

14. An edge-lit extra-flat panel comprising the transparent flat article as claimed in claim 11.

15. A process for manufacturing a transparent flat article from the composition as claimed in claim 1 comprising a step of extruding said composition.

\* \* \* \* \*